(12) United States Patent
Yano

(10) Patent No.: US 8,866,962 B2
(45) Date of Patent: Oct. 21, 2014

(54) IMAGING APPARATUS AND CAMERA SYSTEM

(71) Applicant: Canon Kabushiki Kaisha, Tokyo (JP)

(72) Inventor: Shinichiro Yano, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 37 days.

(21) Appl. No.: 13/681,276

(22) Filed: Nov. 19, 2012

(65) Prior Publication Data

US 2013/0128102 A1 May 23, 2013

(30) Foreign Application Priority Data

Nov. 21, 2011 (JP) ................................. 2011-253785

(51) Int. Cl.
| | |
|---|---|
| H04N 5/222 | (2006.01) |
| H04N 5/228 | (2006.01) |
| H04N 5/262 | (2006.01) |
| G03B 15/03 | (2006.01) |
| H04N 5/232 | (2006.01) |
| H04N 5/225 | (2006.01) |

(52) U.S. Cl.
CPC ......... *H04N 5/23241* (2013.01); *H04N 5/2256* (2013.01)
USPC ........ 348/371; 348/222.1; 348/239; 348/270; 396/155

(58) Field of Classification Search
USPC .................... 348/208.99–208.16, 222.1, 239, 348/370–371; 396/155–206
See application file for complete search history.

(56) References Cited

U.S. PATENT DOCUMENTS

| | | | | |
|---|---|---|---|---|
| 4,985,725 | A * | 1/1991 | Serikawa | 396/159 |
| 5,148,212 | A * | 9/1992 | Serikawa et al. | 396/61 |
| 5,420,635 | A * | 5/1995 | Konishi et al. | 348/362 |
| 5,634,146 | A * | 5/1997 | Goo | 396/61 |
| 5,729,772 | A * | 3/1998 | Sato et al. | 396/159 |
| 5,752,093 | A * | 5/1998 | Ishiguro et al. | 396/61 |
| 5,808,681 | A * | 9/1998 | Kitajima | 348/371 |
| 5,946,035 | A * | 8/1999 | Suh | 348/371 |
| 6,657,671 | B1 * | 12/2003 | Sasaki | 348/367 |
| 6,657,672 | B1 * | 12/2003 | Okamura | 348/371 |
| 6,753,920 | B1 * | 6/2004 | Momose et al. | 348/371 |
| 6,856,765 | B2 * | 2/2005 | Okubo | 396/88 |
| 6,952,234 | B2 * | 10/2005 | Hatano | 348/363 |
| 7,002,624 | B1 * | 2/2006 | Uchino et al. | 348/225.1 |
| 7,039,307 | B2 * | 5/2006 | Uchida | 396/67 |
| 7,301,563 | B1 * | 11/2007 | Kakinuma et al. | 348/208.13 |

(Continued)

FOREIGN PATENT DOCUMENTS

JP 2007-180904 A 7/2007

*Primary Examiner* — Michael Osinski
(74) *Attorney, Agent, or Firm* — Canon U.S.A., Inc. IP Division

(57) ABSTRACT

An imaging apparatus capable of performing shooting with flash light emitted by a flash device includes an imaging unit configured to capture an image of an object to output image data, and a charging control unit configured to perform charging control of a capacitor configured to accumulate energy for performing flash emission by the flash device. The charging control unit, in a case where shooting with flash light emitted by the flash device is performed, among a plurality of shooting operations for acquiring a plurality of pieces of image data to be used for image combining processing, performs the charging control so that charging of the capacitor is not performed until the last shooting of the plurality of shooting operations for acquiring a plurality of pieces of image data to be used for the image combining processing is finished.

24 Claims, 4 Drawing Sheets

(56) References Cited

U.S. PATENT DOCUMENTS

| | | | |
|---|---|---|---|
| 7,359,632 B2* | 4/2008 | Tohyama | 396/155 |
| 7,379,094 B2* | 5/2008 | Yoshida et al. | 348/208.99 |
| 7,420,613 B2* | 9/2008 | Lee | 348/371 |
| 7,486,884 B2* | 2/2009 | Okuno et al. | 396/155 |
| 7,509,042 B2* | 3/2009 | Mori et al. | 396/155 |
| 7,606,480 B2* | 10/2009 | Chen | 396/164 |
| 7,702,234 B2* | 4/2010 | Tokiwa et al. | 396/155 |
| 7,755,664 B2* | 7/2010 | Kakinuma et al. | 348/208.1 |
| 7,847,858 B2* | 12/2010 | Huang | 348/370 |
| 7,847,859 B2* | 12/2010 | Kobayashi | 348/371 |
| 7,995,912 B2* | 8/2011 | Murakami et al. | 396/164 |
| 8,081,220 B2* | 12/2011 | Kawai | 348/208.12 |
| 8,634,021 B2* | 1/2014 | Kawakami | 348/371 |
| 2002/0154910 A1* | 10/2002 | Iwasaki | 396/157 |
| 2003/0164890 A1* | 9/2003 | Ejima et al. | 348/333.1 |
| 2004/0179832 A1* | 9/2004 | Okabe | 396/157 |
| 2004/0201731 A1* | 10/2004 | Kakinuma et al. | 348/229.1 |
| 2005/0088568 A1* | 4/2005 | Uenaka | 348/370 |
| 2005/0089322 A1* | 4/2005 | Uenaka | 396/157 |
| 2005/0140822 A1* | 6/2005 | Ichikawa | 348/370 |
| 2005/0179810 A1* | 8/2005 | Okamura | 348/371 |
| 2006/0006844 A1* | 1/2006 | Koyama | 320/166 |
| 2006/0067668 A1* | 3/2006 | Kita | 396/182 |
| 2007/0025718 A1* | 2/2007 | Mori et al. | 396/155 |
| 2007/0230939 A1* | 10/2007 | Tanaka et al. | 396/155 |
| 2007/0253694 A1* | 11/2007 | Miyazawa et al. | 396/234 |
| 2007/0253695 A1* | 11/2007 | Miyazawa et al. | 396/234 |
| 2007/0264000 A1* | 11/2007 | Hsieh et al. | 396/157 |
| 2008/0124067 A1* | 5/2008 | Eliasson | 396/108 |
| 2008/0175579 A1* | 7/2008 | Kawakami | 396/155 |
| 2008/0252753 A1* | 10/2008 | Ejima et al. | 348/231.99 |
| 2009/0122181 A1* | 5/2009 | Matsui | 348/370 |
| 2010/0110224 A1* | 5/2010 | Kakinuma et al. | 348/223.1 |
| 2010/0165181 A1* | 7/2010 | Murakami et al. | 348/371 |
| 2011/0050946 A1* | 3/2011 | Lee et al. | 348/222.1 |
| 2011/0074983 A1* | 3/2011 | Bush | 348/241 |
| 2011/0292251 A1* | 12/2011 | Takayanagi et al. | 348/239 |
| 2012/0177352 A1* | 7/2012 | Pillman et al. | 396/61 |

* cited by examiner

IMAGING APPARATUS AND CAMERA SYSTEM

BACKGROUND OF THE INVENTION

1. Field of the Invention

The present invention relates to an imaging apparatus and a camera system that are capable of combining a plurality of images obtained by performing a plurality of shooting operations.

2. Description of the Related Art

Conventionally, in a shooting scene when a person is being shot in a night scene for a background, for example, to acquire an image in which brightness of both the person and the background is good, a technique for combining images acquired by shooting with flash light emitted by a flash device and images acquired without flashlight emission is discussed in Japanese Patent Application Laid-Open No. 2007-180904.

In such a technique, an image of the person with good brightness can be acquired by shooting with flash light emitted by the flash device with an amount of flashlight corresponding to the brightness of the person, and an image with good brightness of the background can be acquired by shooting with an exposure time corresponding to the brightness of the background. By performing an image combining operation by using the former image for the person portion and using the latter image for the background portion, an image having good brightness of both the person and the background can be acquired.

Further, when an image is shot with an exposure time corresponding to the brightness of the background, the exposure time becomes long and an influence of an operator's camera-shake becomes significant. Therefore, the brightness of the background is made good by dividing the exposure time, corresponding to the brightness of the background, into a plurality of parts, and then performing a plurality of shooting operations with the divided exposure time to perform the image combining operation.

However, like the technique discussed in Japanese Patent Application Laid-Open No. 2007-180904, in a case where shooting with flash light emitted by the flash device and shooting without flash light emitted by the flash device are continuously performed, and a plurality of images obtained by continuously performing a plurality of shooting operations without flash light emitted by the flash device are combined, the following problems arise. Hereinbelow, as illustrated in FIG. 4, problems will be described arising in a case where the shooting with flash light emitted by the flash device is performed at the first frame of a series of shooting operations, which includes the shooting with flash light emitted by the flash device and the shooting without flash light emitted by the flash device.

Generally, after shooting with flash light emitted by the flash device, it is desirable to perform charging of a capacitor of the flash device immediately after shooting to shorten a charging waiting time spent until the next shooting with flash light emitted by the flash device becomes possible. In a case where shooting with flash light emitted by the flash device is performed at the first frame of a series of continuous shooting operations, it is assumed that charging will be performed during the subsequent shooting without flash light emitted by the flash device, to shorten a time spent until the next shooting with flash light emitted by the flash device becomes possible. However, subsequent images obtained by shooting without flash light emitted by the flash device may be deteriorated by an influence of electric noise generated by charging (hereinafter, referred to as "charging noise").

Thus, as illustrated in FIG. 4, instead of charging during each shooting of a series of continuous shooting operations (including a time period during which electric signals are readout from the image sensor), by charging between successive shooting operations, the shot image can be free of influence of charging noise. However, when an attempt is made to secure a sufficient charging time between the successive shooting operations, a difference in composition between the images becomes large, and, therefore, it becomes difficult to combine the images.

SUMMARY OF THE INVENTION

According to an aspect of the present invention, an imaging apparatus capable of performing shooting with flash light emitted by a flash device includes an imaging unit configured to capture an image of an object to output image data, and a charging control unit configured to perform charging control of a capacitor configured to accumulate energy for performing flash emission by the flash device. The charging control unit, in a case where shooting with flash light emitted by the flash device is performed among a plurality of shooting operations for acquiring a plurality of pieces of image data to be used for image combining processing, performs the charging control so that charging of the capacitor is not performed until the last shooting of the plurality of shooting operations for acquiring a plurality of pieces of image data to be used for the image combining processing is finished.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
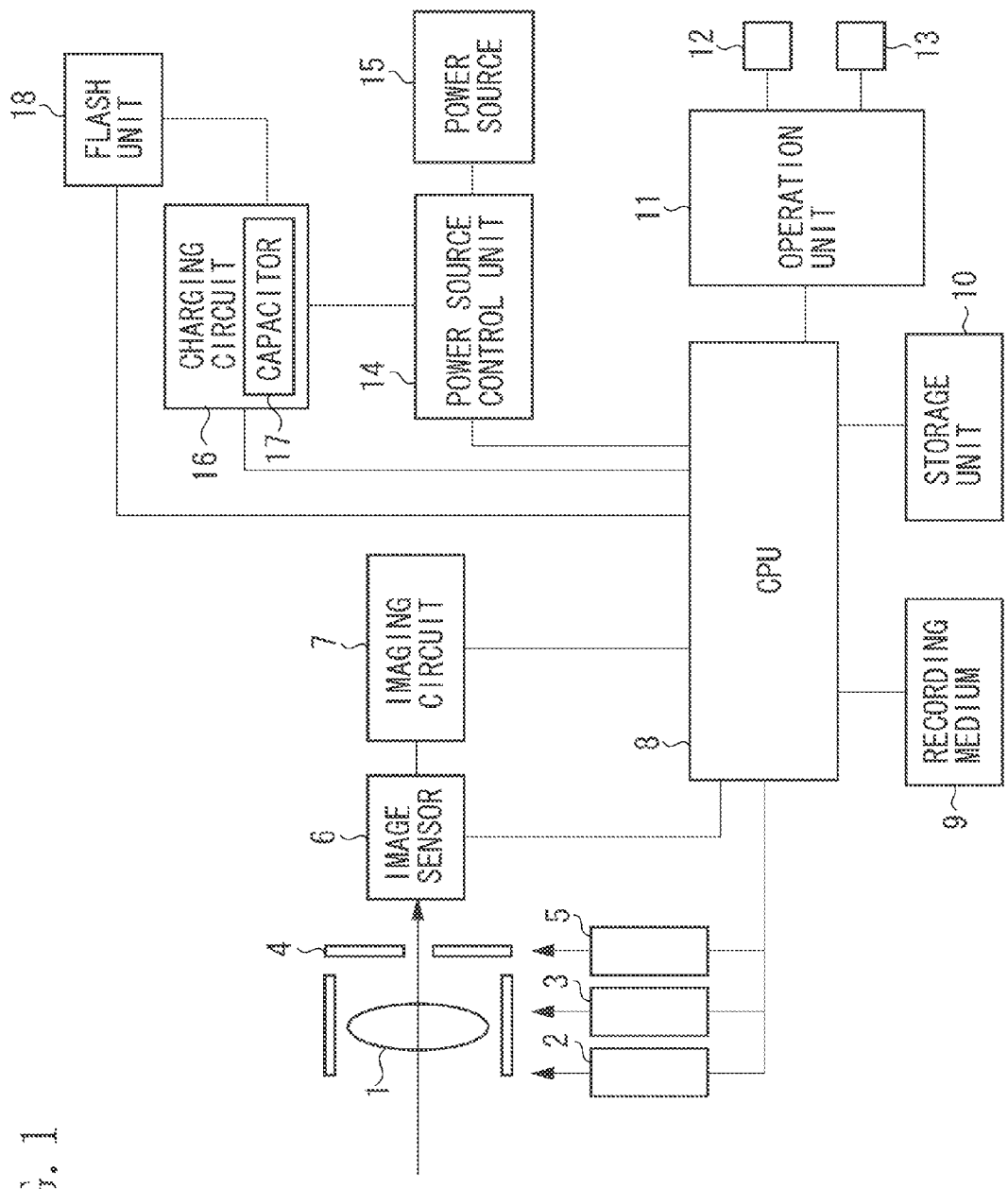
FIG. 1 is a block diagram illustrating a configuration of an imaging apparatus according to an exemplary embodiment of the present invention.

FIG. 1 is a block diagram illustrating a configuration of a camera serving as an imaging apparatus according to an exemplary embodiment, wherein blocks related to the present invention are mainly illustrated.

In FIG. 1, an autofocus (AF) driving unit 2 drives a photographic lens 1 to perform automatic focusing control. The AF driving unit 2 is constituted by, for example, a direct current (DC) motor or a stepping motor, and is configured to bring a desired region within a shooting screen into focus by changing a focus lens position of the photographic lens 1 under the control of a central processing unit (CPU) 8.

A zoom driving unit 3 performs focal length control by driving the photographic lens 1. The zoom driving unit 3 is constituted by, for example, a DC motor or a stepping motor, and changes a focal length of the photographic lens 1 by changing a variable power lens position of the photographic lens 1 under the control of the CPU 8.

A diaphragm 4 adjusts an amount of light incident on an image sensor 6, and a diaphragm driving unit 5 drives the diaphragm 4. The diaphragm driving unit 5 changes an aperture value by driving the diaphragm 4 based on a diaphragm driving amount calculated by the CPU 8.

The image sensor 6 forms an object image, which has passed through the photographic lens 1, and photoelectrically converts the object image. An imaging circuit 7 converts an electric signal obtained from the image sensor 6 into data suitable for recording or exposure calculation as image data and outputs the data to the CPU 8. The CPU 8 can adjust an electric-charge amount accumulated in the image sensor 6 by controlling a charge accumulation time of the image sensor 6. Further, the CPU 8 can adjust shooting sensitivity by controlling a gain of the image sensor 6 or the imaging circuit 7.

The CPU 8 performs light metering based on the image data received from the imaging circuit 7, and calculates an exposure control value, such as an aperture value or a shutter speed, using the obtained light metering value. Further, the CPU 8 performs various types of control or calculation based on an output from an operation unit 11, and records the shot images together with various data relating to the shooting on a recording medium 9.

Further, the CPU 8 controls a charging circuit 16, and performs charging control, such as a start of charging or a stop of charging, of the capacitor 17 for causing a flash unit 18 to emit flash light.

Further, the CPU 8 generates a combined image using a plurality of pieces of image data recorded in the recording medium 9 or a storage unit 10.

The storage unit 10 temporarily stores a plurality of pieces of pre-combined image data obtained by shooting, to combine the image data obtained by performing a plurality of shooting operations.

The operation unit 11 includes a release button for providing start instructions of a shooting preparation operation and a shooting operation, and setting buttons for performing various types of settings.

A first switch 12 (hereinafter referred to as an "SW1") is turned on in a release button half-press state, and a second switch 13 (hereinafter referred to as an "SW2") is turned on in a release button full-press state. When going into the release button half-press state in which only the SW1 is turned on, a shooting preparation operation such as an AF operation or light metering operation is started. When going into the release button full-press state in which both the SW1 and SW2 are turned on, a shooting operation is started.

A power source control unit 14 controls supply of power, and, in this case, controls power supply amounts provided from a power source 15 to the CPU 8 and the charging circuit 16.

The charging circuit 16 includes therein a capacitor 17, and the capacitor 17 accumulates energy for flash light emission. The charging circuit 16, upon receiving a charging start instruction from the CPU 8, starts power supply to the capacitor 17. Further, the charging circuit 16 monitors a charging voltage of the capacitor 17, and stops power supply to the capacitor 17 when the capacitor 17 finishes charging (the charging voltage of the capacitor 17 reaches a predetermined level).

The flash unit 18 emits flash light using energy accumulated in the capacitor 17, upon receiving a flash instruction from the CPU 8.

Figure 2:
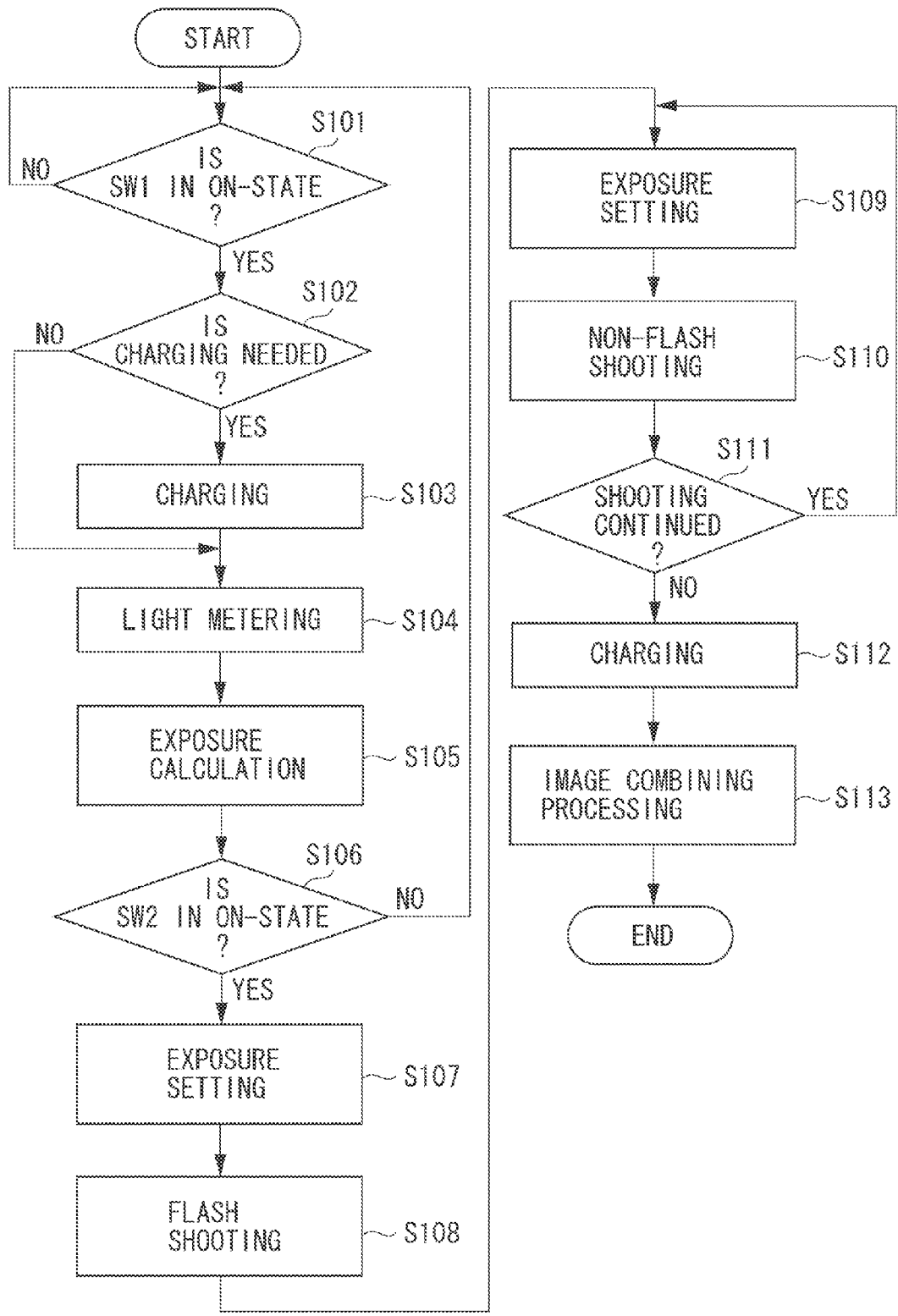
FIG. 2 is a flowchart illustrating a series of operations for performing an image combining operation according to the exemplary embodiment the present invention.

Next, an operation during shooting will be described with reference to FIG. 2 in a shooting mode for performing a plurality of times continuously shooting with flash light emitted by the flash unit 18 and shooting without flash light emitted by the flash unit 18, and for generating a combined image using a plurality of pieces of the acquired image data (hereinafter, referred to as a "combined shooting mode").

In step S101, the CPU 8 determines whether a release button is in half-press state, namely, whether only the SW1 is in ON-state. If only the SW1 is in ON-state (YES in step S101), the processing advances to step S102. In step S102, the CPU 8 determines whether the capacitor 17 finishes charging, namely, whether charging is needed, based on a monitoring result of the capacitor 17 by the charging circuit 16. In this case, the reason why the CPU 8 determines a charging state of the capacitor 17 each time the CPU 8 determines that only the SW1 is in ON-state, is because a charging voltage of the capacitor 17 is lowered, not only when causing the flash unit 18 to emit flash, but also due to self-discharge or the like. By determining the charging state of the capacitor 17 at this timing, the drawback is prevented that charging of the capacitor 17 is performed only after the release button is in full-press state, resulting in waiting for finish of charging. In this case, regarding determination whether charging is finished, or whether charging is needed, it is determined that charging is not finished, or charging is needed, if a charging voltage monitored by the charging circuit 16 is less than a predetermined value.

If the capacitor 17 has finished charging (charging is not needed) (NO in step S102), the processing advances to step S104. If the capacitor 17 has not finished charging (charging is needed) (YES in step S102), the processing advances to step S103. In step S103, the CPU 8 sends a charging start instruction of the capacitor 17 to the charging circuit 16, and charges the capacitor 17 until charging is finished. If the charging of the capacitor 17 is finished, the processing advances to step S104.

In step S104, the CPU 8 acquires image data using the image sensor 6 and the imaging circuit 7, and performs light metering. Then, in step S105, the CPU 8 performs exposure calculation based on light metering values obtained by performing light metering. The exposure calculation herein is supposed to determine exposure control values of all of a plurality of frames of shooting performed in the combined shooting mode, and, more specifically, to determine respective exposure control values of the shooting with flash light emitted by the flash unit 18 (hereinafter, referred to as "flash shooting") and of the shooting without flash light emitted by the flash unit 18 (hereinafter, referred to as "non-flash shooting"). At this time, it is only necessary to combine a plurality of pieces of image data obtained by a plurality of non-flash shooting operations to determine respective exposure control values so that the brightness of the background becomes good. However, in a case where an operator adjusts the brightness of the background darker or brighter by operating the operation unit 11, it is only necessary to set an exposure control value which reflects the operation. Further, respective exposure control values of a plurality of non-flash shooting operations to be determined in step S105 may be the same or may be different from each other.

Next, in step S106, the CPU 8 determines whether the release button is in full-press state, namely, whether the SW2 is in ON-state. If the SW2 is not in ON-state (NO in step S106), the processing returns to step S101. On the other hand, if the SW2 together with SW1 is in ON-state (YES in step S106), the processing advances to step S107.

When the SW2 goes into the ON-state, a series of continuous shooting operations including flash shooting and non-flash shooting is started. In the series of continuous shooting operations, the flash shooting is performed at the first frame and the non-flash shooting is performed at the second frame and beyond. This is to allow a human object to easily recognize start timing of a series of continuous shooting operations, and it becomes possible to suppress an inadvertent movement of the human object, such as moving unaware of being shot.

In step S107, the CPU 8 performs exposure settings such as an aperture value, a shutter speed, and an International Organization for Standardization (ISO) sensitivity, based on exposure control values for the flash shooting determined in step S105.

In step S108, the CPU 8 sends a flash instruction to the flash unit 18 to perform flash shooting by controlling respective units, and then temporarily stores the image data obtained by performing flash shooting in the storage unit 10.

In the present exemplary embodiment, for ease of descriptions, a flash amount of the flash unit 18 at the time of the flash shooting takes a flash amount (a manual flash amount) which the operator sets by operating the operation unit 11. On the other hand, a flash amount calculated by the CPU 8 may be used if the manual flash amount is not set, for example. In a case where the CPU 8 performs calculation of a flash amount, it is only necessary to calculate the flash amount using a known method. The known method includes a method for causing the flash unit 18 to emit pre-flash during the processing from step S106 to step S108, for example, and calculating a flash amount based on a reflected light component of the pre-flash emission, or a method for obtaining an object distance from a position of the photographic lens 1, for example, and calculating a flash amount based on the object distance.

If a charging voltage is not sufficient enough to prepare for the next flash shooting after the flash shooting is performed during normal shooting, the CPU 8 sends a charging start instruction to the charging circuit 16. In the combined shooting mode, however, the CPU 8 does not send the charging start instruction to the capacitor 17 even in a state in which charging voltage is lowered.

In step S109, the CPU 8 performs exposure settings, such as an aperture value, a shutter speed, and an ISO sensitivity, based on the exposure control values for the non-flash shooting determined in step S105.

In step S110, the CPU 8 performs non-flash shooting by controlling respective units, and temporarily stores the image data obtained by the non-flash shooting in the storage unit 10.

Thereafter, in step S111, the CPU 8 determines whether a series of continuous shooting operations is finished. If the series of continuous shooting operations is not yet finished (YES in step S111), the processing returns to step S109. In step S109, the CPU 8 performs exposure settings, and then in step S110, performs again non-flash shooting.

If it is determined that a series of continuous shooting operations is finished (the last readout of electric signals from the image sensor 6 in the continuous shooting is finished) (NO in step S111), then in step S112, the CPU 8, if the charging voltage of the capacitor 17 is insufficient (if charging is needed), sends a charging start instruction to the charging circuit 16, and performs charging of the capacitor 17.

In step S113, the CPU 8 performs image combining processing using the image data obtained by performing flash shooting (first image data) and the image data obtained by performing non-flash shooting (second image data), which are stored in the storage unit 10. At this time, the image combining processing and the charging of the capacitor 17 may be executed in parallel. Further, the CPU 8 performs the image combining processing and records the combined image data thus generated in the recording medium 9. The image combining processing only needs to apply a known method as discussed in Japanese Patent Application Laid-Open No. 2007-180904 and, therefore, the descriptions thereof will be omitted.

Figure 3:
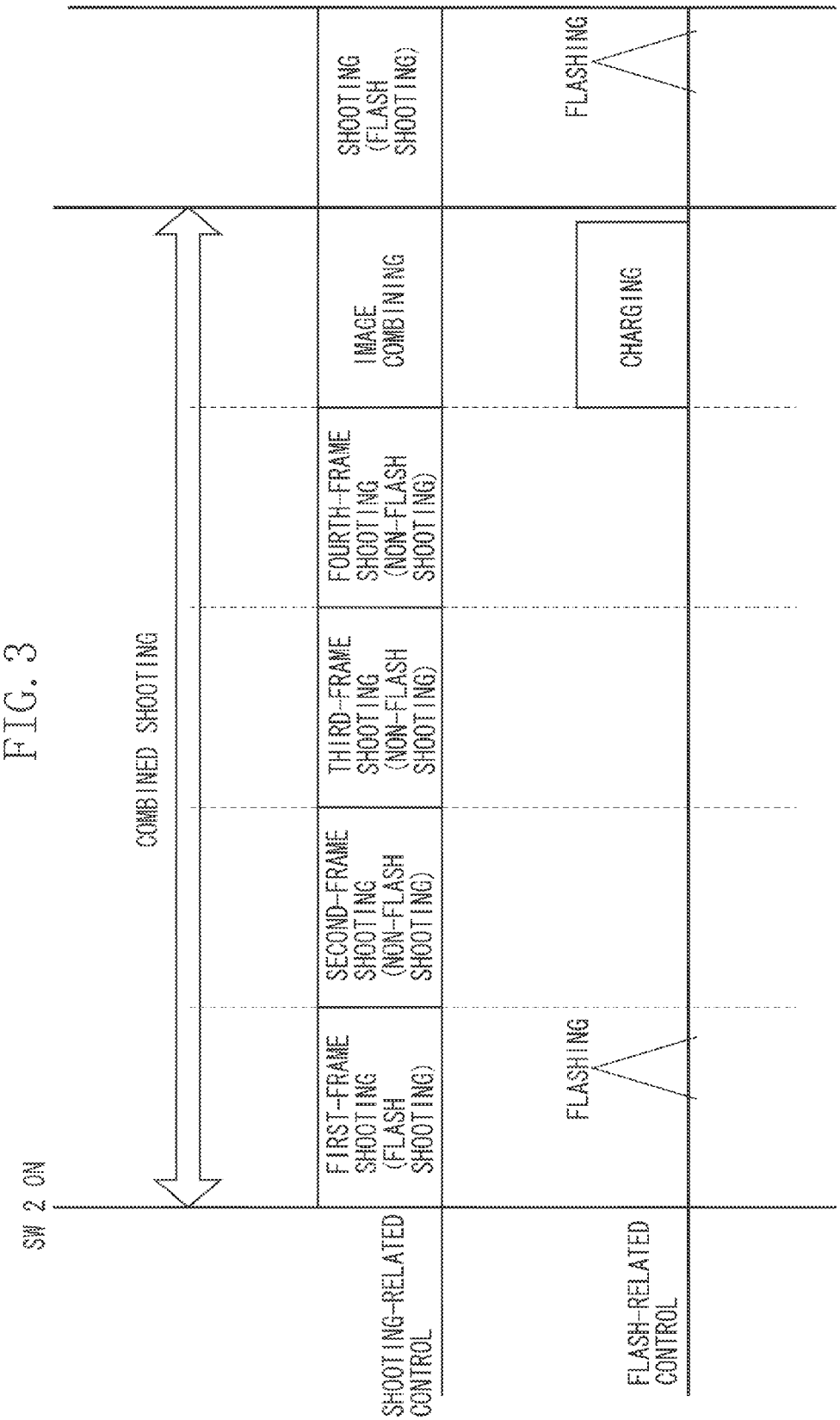
FIG. 3 is a diagram illustrating timing of a series of continuous shooting operations and charging control for performing the image combining operation according to the exemplary embodiment the present invention.
Figure 4:
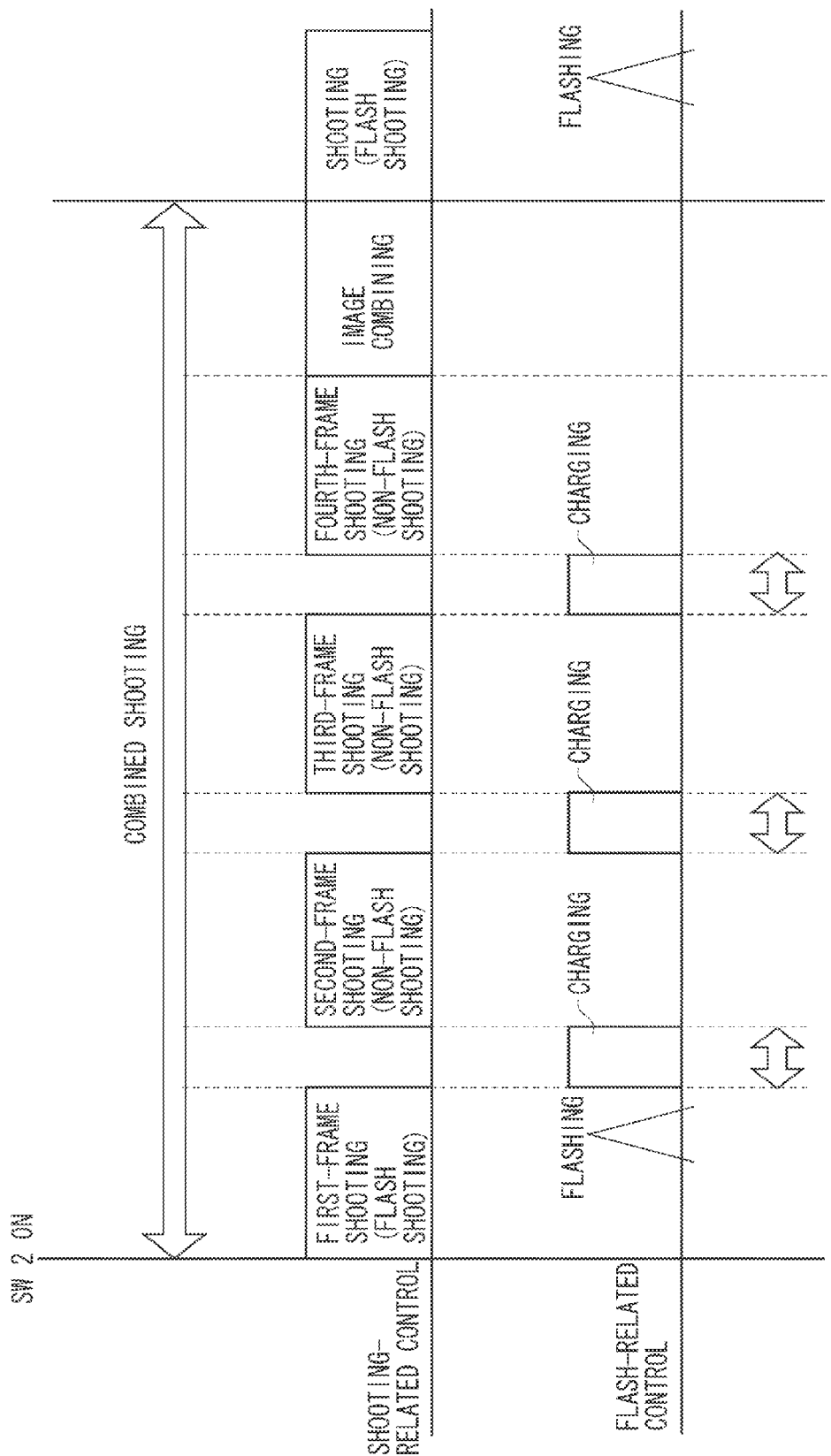
FIG. 4 is a diagram illustrating timing of a series of continuous shooting operations and charging control for performing the image combining operation.

Next, a series of processing in the combined shooting mode will be described with reference to FIG. 3.

When the release button is fully pressed by the operator and the SW2 is turned on, the flash shooting with flash light emitted by the flash unit 18 is performed on the first frame of the continuous shooting. Then, after the flash shooting is performed, even in the condition in which a charging voltage of the capacitor 17 is lowered, and in which a charging voltage for performing the next flash shooting cannot be secured, the second frame of shooting is started without charging the capacitor 17. If a charging voltage is not enough to prepare for the next flash shooting, after the flash shooting is performed during the normal shooting, charging of the capacitor 17 is performed. In the combined shooting mode, however, charging is not performed because a start of the next shooting will be delayed, if charging is performed after the flash shooting. In this way, by continuing to perform the non-flash shooting without charging the capacitor 17 after the flash shooting, a time difference between the flash shooting and the non-flash shooting can be reduced and a difference in composition can be alleviated.

Thereafter, even after the non-flash shooting as the second frame of shooting, by continuing to perform the third frame of non-flash shooting without performing the charging of the capacitor 17, a difference in composition between the second frame and the third frame can be reduced. Similarly, a difference in composition can be alleviated by not performing charging during the period from shooting to the next shooting until the last shooting is finished, even in a state in which the charging voltage of the capacitor 17 is insufficient. As a result, a good combined image can be acquired by the combining processing.

As described above, after the flash shooting, charging is not performed during each shooting operation and during the period between successive shooting operations. However, since a time is needed for the image combining processing after a series of continuous shooting operations, a charging waiting time for performing next shooting with flash light emitted by the flash device can be suppressed by performing charging during that time.

As described above, in the present exemplary embodiment, in a case where shooting with flash light emitted by the flash device is performed, among a plurality of shooting operations for acquiring a plurality of pieces of image data to be used for the image combining processing, the CPU 8 performs charging control, so that the charging of the capacitor 17 is not performed until the last shooting of the plurality of shooting operations is finished. By performing charging at such timing, a good combined image can be acquired while suppressing a charging waiting time for the next flash shooting. Further, in a case where a plurality of shooting operations for acquiring a plurality of pieces of image data to be used for the image combining processing is not performed, the CPU 8 performs charging control so that the charging of the capacitor 17 is performed, when the shooting with flash light emitted by the flash device is finished. For this reason, a time until the next shooting with flash light emitted by the flash device becomes possible can be shortened. When a plurality of shooting operations for acquiring a plurality of pieces of image data to be used for the image combining processing is not performed, the charging control may be performed, so that the charging of the capacitor is performed when the charging voltage of the capacitor becomes less than a predetermined value. Further, when a plurality of shooting operations for acquiring a plurality of pieces of image data to be used for the image combining processing is not performed, the charging control may be performed, so that the charging of the capacitor is performed before a first time elapses after the shooting with flash light emitted by the flash device.

Even in a case where a charging time is longer than a time required for the image combining processing, without raising such problems as might occur when charging is performed during shooting and during a period between successive shooting operations, a good combined image can be acquired while suppressing a charging waiting time for the next flash shooting.

Further, in the present exemplary embodiment, descriptions about a case in which the flash shooting is performed at the first frame in a series of continuous shooting operations for the image combining processing has been provided, but even a configuration in which the flash shooting is performed at the second or subsequent frame is applicable.

Further, if the flash shooting is performed a plurality of times without charging, the flash shooting may be performed a plurality of times in the series of continuous shooting operations.

Further, in the above-described exemplary embodiment, the combined shooting mode for performing flash shooting and non-flash shooting has been described, but a shooting mode for determining based on a light metering result whether to cause the flash device to emit flash in the continuous shooting may be used.

Further, a configuration for performing light metering using a light-metering sensor different from an image sensor for shooting, in place of performing light metering based on the image data obtained by performing shooting may be used.

Further, the charging circuit 16 may be configured to automatically start charging if the charging voltage of the capacitor 17 to be monitored is less than a predetermined value, rather than performing a start of charging based on an instruction from the CPU 8. In such a configuration, the CPU 8 only needs to send a charging prohibition instruction to the charging circuit 16 so that charging is not performed during shooting and during a period between successive shooting operations in a series of continuous shooting operations for acquiring a combined image, and to send a charging permission instruction to the charging circuit 16 when the series of continuous shooting operations is finished.

Further, components relating to charging and flashing such as the charging circuit 16 and the flash unit 18 in the present exemplary embodiment may be the ones of the flash device detachably attached to a camera, instead of being built in the camera. In this case, the flash device and the camera constitute a camera system according to the present exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-253785 filed Nov. 21, 2011, which is hereby incorporated by reference herein in its entirety.

What is claimed is:

1. An imaging apparatus configured for performing shooting with flash light emitted by a flash device, the imaging apparatus comprising:
an imaging unit configured to capture an image of an object to output image data; and
a charging control unit configured to perform charging control of a capacitor configured to accumulate energy for performing flash emission by the flash device,
wherein the charging control unit, in a case where shooting with flash light emitted by the flash device is performed among a plurality of shooting operations for acquiring a plurality of pieces of image data used for image combining processing, performs the charging control so that charging of the capacitor is not performed until the last shooting of the plurality of shooting operations for acquiring a plurality of pieces of image data used for the image combining processing is finished.

2. The imaging apparatus according to claim 1, wherein the charging control unit, in a case where a plurality of shooting operations for acquiring a plurality of pieces of image data used for the image combining processing is not performed, performs the charging control so that charging of the capacitor is performed when shooting with flash light emitted by the flash device is finished, and in a case where a plurality of shooting operations for acquiring a plurality of pieces of image data used for the image combining processing is performed, the charging control unit performs the charging control so that charging of the capacitor is not performed until the last shooting of the plurality of shooting operations for acquiring a plurality of pieces of image data used for the image combining processing is finished even when shooting with flash light emitted by the flash device is finished.

3. The imaging apparatus according to claim 1, wherein the charging control unit, in a case where a plurality of shooting operations for acquiring a plurality of pieces of image data used for the image combining processing is not performed, performs the charging control so that charging of the capacitor is performed when a charging voltage of the capacitor becomes less than a predetermined value, and in a case where a plurality of shooting operations for acquiring a plurality of pieces of image data used for the image combining processing is performed, the charging control unit performs the charging control so that charging of the capacitor is not performed until the last shooting of the plurality of shooting operations for acquiring a plurality of pieces of the image data used for the image combining processing is finished even when the charging voltage of the capacitor becomes less than the predetermined value.

4. The imaging apparatus according to claim 1, wherein the charging control unit, in a case where a plurality of shooting operations for acquiring a plurality of pieces of image data used for the image combining processing is not performed, performs the charging control so that charging of the capacitor is performed before a first time elapses after shooting with flash light emitted by the flash device is finished, and in a case where a plurality of shooting operations for acquiring a plurality of pieces of image data used for the image combining processing is performed, performs the charging control so that charging of the capacitor is not performed until the last shooting of the plurality of shooting operations for acquiring a plurality of pieces of image data used for the image combining processing is finished even when the first time elapses after shooting with flash light emitted by the flash device is finished.

5. The imaging apparatus according to claim 1, wherein the charging control unit, in a case where shooting with flash light emitted by the flash device is performed among a plurality of shooting operations for acquiring a plurality of pieces of image data not used for the image combining processing, after shooting with flash light emitted by the flash device is finished, performs the charging control so that charging of the capacitor is performed before the next shooting among the plurality of shooting operations is started.

6. The imaging apparatus according to claim 1, wherein the charging control unit, in a case where shooting with flash light emitted by the flash device is performed among a plurality of shooting operations for acquiring a plurality of pieces of image data not used for the image combining processing, performs the charging control so that charging of the capacitor is performed before the next shooting among the plurality of shooting operations is started when shooting with flash light emitted by the flash device is performed and when a charging voltage of the capacitor becomes less than a predetermined value.

7. The imaging apparatus according to claim 1, further comprising an image combining unit configured to perform image combining processing based on a plurality of pieces of image data output from the imaging unit after a plurality of shooting operations is continuously performed.

8. The imaging apparatus according to claim 7, wherein the charging control unit performs the charging control so that charging of the capacitor is performed while the image combining processing is performed by the image combining unit.

9. The imaging apparatus according to claim 1, wherein the plurality of shooting operations for acquiring a plurality of pieces of image data used for the image combining processing includes shooting with flash light emitted by the flash device and shooting without flash light emitted by the flash device, and
wherein, in the plurality of shooting operations for acquiring a plurality of pieces of image data used for the image combining processing, shooting without flash light emitted by the flash device is performed at least one time after shooting with flash light emitted by the flash device.

10. The imaging apparatus according to claim 8, wherein in a first shooting of the plurality of shooting operations for acquiring a plurality of pieces of image data used for the image combining processing, shooting with flash light emitted by the flash device is performed.

11. The imaging apparatus according to claim 7, further comprising a storage unit configured to temporarily store a plurality of pieces of image data output from the imaging unit,
wherein the image combining unit performs the image combining processing based on the plurality of pieces of image data stored in the storage unit.

12. A camera system including an imaging apparatus and a flash device, the camera system comprising:
an imaging unit configured to capture an image of an object to output image data;
a flash unit;
a capacitor configured to accumulate energy for causing the flash unit to emit flash; and
a charging control unit configured to perform charging control of the capacitor,
wherein the charging control unit, in a case where a plurality of shooting operations is continuously performed and a plurality of pieces of image data used for image combining processing is output from the imaging unit, and in a case where shooting with flash light emitted by the flash device among the plurality of shooting operations is performed, performs the charging control so that charging of the capacitor is not performed until the last shooting of the plurality of shooting operations is finished.

13. An imaging apparatus configured for performing shooting with flash light emitted by a flash device, the imaging apparatus comprising:
an image sensor configured to form an object image to photoelectrically convert the object image; and
a charging control unit configured to perform charging control of a capacitor configured to accumulate energy for emitting flash by the flash device,
wherein the charging control unit, in a case where shooting with flash light emitted by the flash device is performed among a plurality of shooting operations for acquiring a plurality of pieces of image data used for image combining processing, performs the charging control so that charging of the capacitor is not performed until last readout of an electric signal from the image sensor for acquiring a plurality of pieces of image data used for the image combining processing is finished.

14. A camera system including an imaging apparatus and a flash device, the camera system comprising:
an image sensor configured to form an object image to photoelectrically convert the object image;
a flash unit;
a capacitor configured to accumulate energy for causing the flash unit to emit flash; and
a charging control unit configured to perform charging control of the capacitor,
wherein the charging control unit, in a case where shooting with flash light emitted by the flash device is performed among a plurality of shooting operations for acquiring a plurality of pieces of image data used for image combining processing, performs the charging control so that charging of the capacitor is not performed until last readout of an electric signal from the image sensor for acquiring a plurality of pieces of image data used for the image combining processing is finished.

15. The imaging apparatus according to claim 13, wherein the charging control unit, in a case where a plurality of shooting operations for acquiring a plurality of pieces of image data to be used for the image combining processing is not performed, performs the charging control so that charging of the capacitor is performed when shooting with flash light emitted by the flash device is finished, and in a case where a plurality of shooting operations for acquiring a plurality of pieces of image data to be used for the image combining processing is performed, the charging control unit performs the charging control so that charging of the capacitor is not performed until last readout of the electric signal from the image sensor for acquiring a plurality of pieces of image data to be used for the image combining processing is finished even when shooting with flash light emitted by the flash device is finished.

16. The imaging apparatus according to claim 13, wherein the charging control unit, in a case where a plurality of shooting operations for acquiring a plurality of pieces of image data to be used for the image combining processing is not performed, performs the charging control so that charging of the capacitor is performed when a charging voltage of the capacitor becomes less than a predetermined value, and in a case where a plurality of shooting operations for acquiring a plurality of pieces of image data to be used for the image combining processing is performed, the charging control unit performs the charging control so that charging of the capacitor is not performed until last readout of the electric signal from the image sensor for acquiring a plurality of pieces of the image data to be used for the image combining processing is finished even when the charging voltage of the capacitor becomes less than the predetermined value.

17. The imaging apparatus according to claim 13, wherein the charging control unit, in a case where a plurality of shooting operations for acquiring a plurality of pieces of image data to be used for the image combining processing is not performed, performs the charging control so that charging of the capacitor is performed before a first time elapses after shooting with flash light emitted by the flash device is finished, and in a case where a plurality of shooting operations for acquiring a plurality of pieces of image data to be used for the image combining processing is performed, performs the charging control so that charging of the capacitor is not performed until last readout of the electric signal from the image sensor for acquiring a plurality of pieces of image data to be used for the image combining processing is finished even when the first time elapses after shooting with flash light emitted by the flash device is finished.

18. The imaging apparatus according to claim 13, wherein the charging control unit, in a case where shooting with flash light emitted by the flash device is performed among a plurality of shooting operations for acquiring a plurality of pieces of image data not to be used for the image combining processing, after shooting with flash light emitted by the flash device is finished, performs the charging control so that charging of the capacitor is performed before the next shooting among the plurality of shooting operations is started.

19. The imaging apparatus according to claim 13, wherein the charging control unit, in a case where shooting with flash light emitted by the flash device is performed among a plurality of shooting operations for acquiring a plurality of pieces of image data not to be used for the image combining processing, performs the charging control so that charging of the capacitor is performed before the next shooting among the plurality of shooting operations is started when shooting with flash light emitted by the flash device is performed and when a charging voltage of the capacitor becomes less than a predetermined value.

20. The imaging apparatus according to claim 13, further comprising an image combining unit configured to perform image combining processing based on a plurality of pieces of image data output from the imaging unit after a plurality of shooting operations is continuously performed.

21. The imaging apparatus according to claim 20, wherein the charging control unit performs the charging control so that charging of the capacitor is performed while the image combining processing is performed by the image combining unit.

22. The imaging apparatus according to claim 13, wherein the plurality of shooting operations for acquiring a plurality of pieces of image data to be used for the image combining processing includes shooting with flash light emitted by the flash device and shooting without flash light emitted by the flash device, and
wherein, in the plurality of shooting operations for acquiring a plurality of pieces of image data to be used for the image combining processing, shooting without flash light emitted by the flash device is performed at least one time after shooting with flash light emitted by the flash device.

23. The imaging apparatus according to claim 20, wherein in a first shooting of the plurality of shooting operations for acquiring a plurality of pieces of image data to be used for the image combining processing, shooting with flash light emitted by the flash device is performed.

24. The imaging apparatus according to claim 20, further comprising a storage unit configured to temporarily store a plurality of pieces of image data output from the imaging unit,
wherein the image combining unit performs the image combining processing based on the plurality of pieces of image data stored in the storage unit.

* * * * *